Patented Feb. 6, 1934

1,946,254

UNITED STATES PATENT OFFICE 1,946,254

PREPARATION OF CARBOXYLIC ACIDS

John C. Woodhouse, Wilmington, Del., assignor to E. I. du Pont de Nemours & Company, Wilmington, Del., a corporation of Delaware No Drawing. Application November 15, 1932
Serial No. 642,759

20 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst, acetic acid, methyl acetate, and methyl formate may be prepared in proportions which are governed by the particular operating conditions.

An object of this invention is to provide improvements in processes for the preparation of higher molecular weight organic compounds thru the introduction of carbon monoxide into the lower molecular weight organic compounds. A further object of this invention is to provide a process for the preparation of monocarboxylic acids by the condensation of an aliphatic alcohol with a carbon oxide in the presence of a catalyst. Another object of this invention is to provide a process for the preparation of acids having the structural formula: $C_nH_{2n+1}COOH$—from alcohols having the structural formula: $C_nH_{2n+1}OH$—by subjecting the alcohols to the action of the carbon monoxide in the presence of a volatile inorganic acid and in the presence or absence of an absorbent material such as pumice, silica gel, active carbon, etc. A still further object of the invention is to provide a process for the preparation of organic compounds by reacting an alcohol, carbon monoxide, and steam in the presence of a halogen as the catalyst. Other objects will hereinafter appear.

The above objects can be realized by passing a vaporized aliphatic monohydroxy alcohol, carbon monoxide, and a halogen, preferably chlorine, under suitable pressure and temperature conditions, over active carbon or more particularly over activated charcoal. In lieu of the halogens I may use the non-metals, sulfur, tellurium, phosphorus, etc., or any compound which is volatile under the temperature of the reaction and which hydrolyzes or otherwise reacts with the steam or other gaseous reactant present to give an inorganic acid. The halogens such as chlorine, with steam, give hydrogen chloride and hydrogen oxychloride,—the other non-metals giving, according to their nature and the conditions of the reaction, oxygenated or non-oxygentated acids. The products resulting from such a reaction will contain generally a mixture of, among other compounds, aliphatic carboxylic acids some of which have a greater, some a lesser, number of carbon atoms than are present in the alcohol treated,—an aliphatic acid containing one more carbon atom than the alcohol, usually, predominating.

My preferred class of catalysts are the halogens, chlorine, bromine, iodine, and fluorine; chlorine being the preferred halogen. Other catalysts, which are suitable, include the non-metals which react with water to form acids, e. g. sulfur, tellurium, phosphorus, and other compounds, organic or inorganic, which in the presence of steam or other reactants and the conditions of the reaction form acids. Compounds coming under this heading include the volatile halogen compounds such as ammonium chloride, carbon tetrachloride, methyl, ethyl, and the other alkyl halides, the aromatic halides, benzyl chloride, tolyl chloride, methyl, ethyl, and the other mercaptans, methyl phosphine, methyl nitrate, ethyl hydroselenide, sulfuryl chloride, antimony chloride, chromyl chloride, manganese perchloride, etc. In fact, any compound or element, volatile at the temperature of the reaction, in order that it may be injected into the reaction zone in the vapor phase, and which will form an acid when present therein, are suitable. It is understood, however, that for uniformly high yields and best overall operating conditions I prefer to use the halogens and of the halogens chlorine, due to its availability and excellent operating characteristics.

The alcohol-carbon monoxide reaction which can be accelerated by the above described catalysts may be expressed as follows:

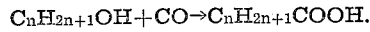
$$C_nH_{2n+1}OH + CO \rightarrow C_nH_{2n+1}COOH.$$

In accordance with the particular operating conditions, it will be found that, in some instances, the acid may not be formed directly in the free state, but may be produced as the ester of the alcohol. The alcohols used may be replaced, if desired, wholly or partly by the corresponding alkyl ethers of the alcohols, such as dimethyl ether, diethyl ether, or the mixed alkyl ethers, the alkyl esters, the alkyl amines, or the alkyl halides. Experts in this art know that it is advantageous, altho not essential, to have water vapor present during the methanol-carbon monoxide to acetic acid reaction. This is true also when the reaction is conducted with compounds which decompose to give the alcohol and is especially advantageous when the compound is such that it forms the alcohol by hydrolysis.

The synthesis can generally be efficiently carried out under the following operating conditions. The pressure may vary from approximately 25 atmospheres to 900 atmospheres or higher with the preferable operating range in the neighborhood of 350–700 atmospheres. These pressures do not differ materially from those used when other types of catalysts are employed for this synthesis nor do the temperatures vary appreciably from those already known for reactions of this type. For example, the process can be suitably carried out, with my catalyst, at temperatures of between 200–400° C., but still higher or lower temperatures may also be used in some cases, the speed of the reaction being increased, as would be expected, by the use of higher temperatures.

The carbon monoxide used may be obtained from various commercial sources, such, for example, as from water gas, producer gas, coke oven gas, carbide preparation, etc., but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohols and carbon monoxide on one pass thru the conversion apparatus. Other strictly inert gases usually act similarly. It is, of course, understood that instead of introducing methanol itself into the reaction chamber substances or mixtures of substances which decompose by hydrolyzing, for example, to form alcohols or which decompose to form esters or ethers may be employed, but generally I prefer to introduce methanol directly into the gas stream.

My process can be conveniently carried out by passing purified carbon monoxide into aqueous methanol maintained at such a temperature that the issuing gases will have the requisite proportion of methanol, carbon monoxide, and a portion of the desired water vapor. The water soluble catalyst, such as chlorine, may be dissolved in water which may be injected into the system to give the desired amount of catalyst and total water vapor. Or alternatively, methanol soluble catalysts may be dissolved in aqueous methanol and the resulting solution injected into the carbon monoxide stream prior to the reaction. I have found that a gaseous composition, containing an excess of carbon monoxide over the methanol vapor, will give a good yield of acetic acid and its ester on one pass thru a converter, the temperature of the reaction chamber being maintained at approximately 375° C. and the pressure held in the neighborhood of 700 atmospheres.

Not only can methanol be catalyzed in the presence of carbon monoxide and my catalyst to acetic acid, or methyl acetate, but the higher alcohols, such as ethyl alcohol, propyl alcohol, butyl alcohol, and even the higher molecular weight alcohols, such, for example, as hexyl alcohol or octyl alcohol, may be similarly converted into an acid having correspondingly one more carbon atom than the alcohol treated. In fact, my process and catalyst may be employed with any of the alcohols, providing these alcohols volatilize without decomposition at the temperature of the reaction. When converting the higher aliphatic alcohols, some of which are not water soluble, and particularly if water is desired in the reaction, it is preferable, generally, to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohols, the ethers, amines, halides, or esters thereof, the use of which will result in a good conversion with generally some slight modification in the ratio of acid to other products obtained.

I will now describe a specific embodiment of my process, but it will be understood that the details therein given and the compounds employed, either as reactants or catalysts, in no way restrict the scope of this invention, but merely illustrate one manner in which my process may be carried out.

A gaseous mixture, containing 85% carbon monoxide, and 5% each of methanol, water vapor, and hydrogen, is passed together with approximately 0.25% chlorine over activated charcoal which is disposed in a conversion chamber suitable for the carrying out of gaseous exothermic reactions. The reaction is conducted at a temperature of approximately 325° C. and a pressure of approximately 700 atmospheres. Upon condensation of the products of the reaction a good yield of acetic acid is obtained together with a small amount of esters and other organic compounds.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces of the apparatus with chromium or silver, or using for the construction of this equipment acid-resisting alloy steels containing, for example, molybdenum, cobalt, tungsten, chromium, manganese, or nickel.

From a consideration of the above specification it will be realized that any process in which a carbon oxide is combined with an organic compound giving a product containing an aliphatic acid in which alcohols are converted to acids will come within the scope of this invention when such reactions are accelerated in the presence of a volatile inorganic acid.

I claim:

1. A process for the preparation of oxygenated aliphatic organic compounds which comprises contacting a compound selected from the group consisting of a saturated aliphatic alcohol which is substantially not decomposed when vaporized, and a compound which gives a saturated aliphatic alcohol upon hydrolysis and carbon monoxide with a volatile inorganic acid.

2. A process for the preparation of oxygenated aliphatic organic compounds which comprises contacting a compound selected from the group consisting of a saturated aliphatic alcohol which is substantially not decomposed when vaporized, and a compound which gives a saturated aliphatic alcohol upon hydrolysis and carbon monoxide with a volatile inorganic acid formed in situ.

3. A process for the preparation of oxygenated aliphatic organic compounds which comprises contacting a compound selected from the group consisting of a saturated aliphatic alcohol which is substantially not decomposed when vaporized, and a compound which gives a saturated aliphatic alcohol upon hydrolysis and carbon monoxide with a volatile inorganic acid formed in situ and an absorbent material.

4. A process for the preparation of oxygenated aliphatic organic compounds which comprises contacting a compound selected from the group consisting of a saturated aliphatic alcohol which is substantially not decomposed when vaporized, and a compound which gives a saturated aliphatic alcohol upon hydrolysis, and carbon monoxide with a volatile inorganic acid, formed in situ, and active carbon.

5. A process for the preparation of oxygenated organic compounds which comprises contacting carbon monoxide and a compound selected from the group consisting of saturated monohydroxy aliphatic alcohols which are not substantially decomposed when vaporized, the alkyl ethers, the alkyl esters, the alkyl amines, and the alkyl halides in the presence of a volatile inorganic acid with active carbon.

6. A process for the preparation of oxygenated organic compounds which comprises contacting carbon monoxide and a compound selected from the group consisting of saturated monohydroxy aliphatic alcohols which are not substantially decomposed when vaporized, the alkyl ethers, the alkyl esters, the alkyl amines, and the alkyl halides in the presence of a volatile inorganic acid with active carbon.

7. A process for the preparation of compounds containing an acetyl group which comprises subjecting a compound containing a hydrolyzable methoxy group to the action of carbon monoxide in the presence of a volatile inorganic acid catalyst.

8. A process for the preparation of compounds containing an acetyl group which comprises subjecting a compound containing a hydrolyzable methoxy group to the action of carbon monoxide in the presence of a volatile inorganic acid catalyst formed in situ.

9. A process for the preparation of compounds containing an acetyl group which comprises subjecting a compound containing a hydrolyzable methoxy group to the action of carbon monoxide in the presence of a volatile inorganic acid catalyst formed in situ and an absorbent material.

10. A process for the preparation of compounds containing an acetyl group which comprises subjecting a compound containing a hydrolyzable methoxy group to the action of carbon monoxide in the presence of a volatile inorganic acid catalyst formed in situ and active carbon.

11. A process for the preparation of compounds containing an acetyl group which comprises passing a gaseous mixture including a compound containing a hydrolyzable methoxy group steam and carbon monoxide, together with a catalyst into the reaction, the catalyst existing in the vapor phase at the temperature of the reaction, and reacting with the gaseous mixture to form a volatile inorganic acid.

12. A process for the preparation of compounds containing an acetyl group which comprises passing a gaseous mixture including a compound containing a hydrolyzable methoxy group, carbon monoxide, and steam together with a catalyst into the reaction, the catalyst existing in the vapor phase at the temperature of the reaction, and reacting with the steam to form a volatile inorganic acid.

13. A process for the preparation of compounds containing an acetyl group which comprises passing a gaseous mixture including a compound containing a hydrolyzable methoxy group, carbon monoxide, and steam together with a catalyst over an absorbent material, the catalyst existing in the vapor phase at the temperature of the reaction, and reacting with the steam to form a volatile inorganic acid.

14. A process for the preparation of compounds containing an acetyl group which comprises passing a gaseous mixture including a compound containing a hydrolyzable methoxy group, carbon monoxide, and steam together with a catalyst over active carbon, the catalyst existing in the vapor phase at the temperature of the reaction, and reacting with the steam to form a volatile inorganic acid.

15. A process for the preparation of aliphatic organic acids which comprises contacting a saturated aliphatic alcohol which is not substantially decomposed when vaporized, carbon monoxide, and a volatile inorganic acid with active carbon.

16. A process for the preparation of acetic acid which comprises contacting methanol, carbon monoxide steam, and chlorine with activated charcoal.

17. A process for the preparation of propionic acid which comprises contacting ethanol, carbon monoxide steam, and chlorine with activated charcoal.

18. In a process for the preparation of compounds containing an acetyl group the step which comprises passing into the reaction carbon monoxide steam an acid forming a non-metal, and an organic compound selected from the group consisting of alcohols which are not substantially decomposed when vaporized and compounds which under the conditions of the reaction give an alcohol upon hydrolysis.

19. In a process for the preparation of compounds containing an acetyl group the step which comprises passing into the reaction carbon monoxide steam, a halogen, and an organic compound selected from the group consisting of alcohols which are not substantially decomposed when vaporized and compounds which under the conditions of the reaction give an alcohol upon hydrolysis.

20. A process for the preparation of compounds containing a carboxyl group directly linked to an alkyl group which comprises reacting an aliphatic alcohol, which is in the vapor phase under the temperature and pressure of the reaction, and carbon monoxide in the presence of a volatile inorganic acid.

JOHN C. WOODHOUSE.